United States Patent [19]
Gitman et al.

[11] Patent Number: 5,558,822
[45] Date of Patent: Sep. 24, 1996

[54] METHOD FOR PRODUCTION OF SPHEROIDIZED PARTICLES

[75] Inventors: Gregory M. Gitman, Atlanta; Anatoliy Parnas, Norcross, both of Ga.

[73] Assignee: Gas Research Institute, Chicago, Ill.

[21] Appl. No.: 515,860

[22] Filed: Aug. 16, 1995

[51] Int. Cl.$^6$ .................................................. B29C 35/02
[52] U.S. Cl. .................................................. 264/15
[58] Field of Search ........................ 264/15; 75/342; 65/21.3

[56] References Cited

U.S. PATENT DOCUMENTS

| | | |
|---|---|---|
| 1,175,224 | 3/1916 | Bleeker ................................... 65/21.3 |
| 3,015,852 | 1/1962 | Hoffman et al. . |
| 3,272,615 | 9/1966 | Hoffman et al. . |
| 3,282,066 | 11/1966 | Searight . |
| 3,877,960 | 4/1975 | Knoss ........................................ 264/15 |
| 4,221,554 | 9/1980 | Oguchi et al. ............................. 425/7 |
| 4,627,943 | 12/1986 | Seidler ..................................... 264/14 |
| 4,736,527 | 4/1988 | Iwamoto et al. .......................... 264/15 |
| 4,890,562 | 1/1990 | Gitman . |
| 4,952,144 | 8/1990 | Hansz et al. ............................. 425/10 |
| 5,124,091 | 6/1992 | Paliwal et al. ........................... 264/15 |
| 5,143,534 | 9/1992 | Kilner et al. ............................. 264/15 |
| 5,253,991 | 10/1993 | Yokota et al. ............................. 425/6 |

*Primary Examiner*—Mary Lynn Theisen
*Attorney, Agent, or Firm*—Speckman, Pauley & Fejer

[57] ABSTRACT

A method for spheroidizing particles which have a relatively high softening temperature and/or a relatively large average diameter, including ceramic material having a diameter in excess of 0.45 mm. The method includes preheating raw material in a preheater to a temperature below an agglomeration temperature of the material, passing the preheated material in a plurality of streams through a first flame envelope, and cooling the spheroidized particles.

11 Claims, 2 Drawing Sheets

METHOD FOR PRODUCTION OF SPHEROIDIZED PARTICLES

BACKGROUND OF THE INVENTION

1. Field of the Invention

This invention relates to a method for spheroidizing particles. The method according to this invention is suitable for a wide variety of materials, including those that have a relatively high spheroidization temperature, and/or a relatively large average diameter.

2. Description of Prior Art

Methods for spheroidizing particles can generally be divided into two categories, depending on the type of material to be spheroidized.

The first category relates to methods for spheroidizing material that has an average diameter larger than about 0.5 mm, and has a relatively low softening temperature. Unprocessed glass is one example of such a material. A method for spheroidizing such material generally consists of introducing the raw material into one portion of a furnace and introducing a flame into another portion of the furnace. The combustion products of the flame heat the particles to a softening temperature. The central hottest portion of the flame envelope itself is not directly involved with convective heat transfer to the particles.

The second category relates to methods for spheroidizing material that has an average diameter smaller than about 0.10 mm to 0.20 mm, and includes material having a relatively low softening temperature, such as unprocessed glass, as well as material having a relatively high softening temperature, such as ceramics. Methods for spheroidizing such materials include introducing the material into the hottest portion of a specially-shaped flame. U.S. Pat. No. 4,890,562 teaches a method and apparatus for such inflame treatment of material that utilizes an oxygen-fuel or oxygen-air-fuel flame. Although the apparatus of the '562 patent provides a 4000° F. flame, it does not provide for sufficient retention time of the material in the flame necessary to heat ambient-temperature material that has an average diameter larger than about 0.35 mm to 0.45 mm and a relatively high softening temperature to a temperature sufficient for spheroidization.

Sufficient in-flame retention time to promote spheroidization of particles is only one aspect of such a process. A second, and often equally important aspect of a process for spheroidizing particles is the resultant strength of the spheroidized particles. Thermal stresses in particles during spheroidization occur because of non-uniformity of temperature and structure inversions in the particles. Mechanical properties, including strength, of non-metallic particles such as ceramics, for example, are very sensitive to the physical and chemical properties of their surfaces. When hot particles are rapidly cooled, tension stresses appear near the surface of the particles. If the cooling rate is too rapid, the undesirable structure change and high stresses can reduce the strength of the spheroidized particles. For some particles, such as those used as proppants, it is important that the particles have as high a strength as possible. Conventional methods for spheroidizing particles do not include controlled staged cooling which is required to ensure that the particles can withstand relatively high compressive forces.

U.S. Pat. No. 3,272,615 teaches a method for spheroidizing particles, particularly ferro-silicon particles smaller than 270 mesh. The method of the '615 patent includes imparting a swirling motion to the raw material and passing the swirling raw material through a high-temperature flame. The '615 patent teaches that the swirling motion must be sufficient to maintain the particles in the flame until at least the surfaces of the particles melt.

U.S. Pat. No. 3,015,852 teaches a method for passing ferro-silicon particles through a downwardly directed flame that has a reducing zone at a perimeter of the flame.

U.S. Pat. No. 4,221,554 teaches a method and apparatus for spheroidizing thermoplastic material. The method of the '554 patent includes blowing a stream of thermoplastic particles dispersed in a gas into a jet of pressurized hot gas, and then cooling the spherical particles.

U.S. Pat. No. 5,253,991 teaches a method and apparatus for spheroidizing inorganic material such as cement and slag. The method of the '991 patent includes passing the material through a flame and then rapidly cooling the material.

Thus, in view of the teachings of the related art, it is apparent that there is a need for a method for spheroidizing material that has a relatively large average diameter and/or a relatively high softening temperature. Further, it is apparent that there is a need for a method for producing spheroidized particles which can withstand high compressive forces.

SUMMARY OF THE INVENTION

It is one object of this invention to provide a method for producing spheroidized particles from raw material that has a relatively high softening temperature.

It is another object of this invention to provide a method for producing spheroidized particles from raw material that has a relatively large average diameter.

It is yet another object of this invention to provide a method for producing spheroidized particles that withstand relatively high compressive forces.

These and other objects of this invention are achieved with a method for producing spheroidized particles having high thermal efficiency wherein a plurality of particles are introduced into a preheater and heated to a temperature below an agglomeration temperature of the particles. The particles are transported from the preheater into a first flame region, which includes a first burner and a first flame envelope. The first flame envelope is preferably oriented in a gravity flow direction toward a furnace interior.

The particles are preferably transported from the preheater into the first burner through a plurality of insulated tubes. Such insulated tubes reduce undesirable heat transfer from the preheated particles while the preheated particles are transported from the preheater into the first flame region. The particles can be spaced a distance from each other to prevent the particles from sticking together. According to one preferred embodiment of this invention, the preheater comprises a fluidized bed, and the fluidized bed spaces the particles a distance from each other.

The method according to this invention includes a flame region which can include a single flame envelope, or multiple flame envelopes, and melting areas between such flame envelopes. In one preferred embodiment according to this invention in which two burners are utilized, a second burner is positioned in the furnace and is directed toward the first burner. The second burner is preferably, but not necessarily, positioned on a bottom of the furnace. The particles are heated in the flame region until the particles begin to spheroidize. The particles flow from the first flame envelope into a melting area defined by the first burner flame stream and the second burner flame stream.

The particles are then cooled in a first cooling zone that is downstream with respect to the first flame envelope. The particles are cooled to a first temperature below the spheroidization temperature of the particles. According to another preferred embodiment of this invention, the particles are then further cooled in a second cooling zone to a second temperature between the first temperature and an ambient temperature. According to yet another preferred embodiment of this invention, the particles can then be further cooled in a third cooling zone to about an ambient temperature. Such staged cooling achieves an internal strength sufficient for the particles to withstand relatively high compressive forces.

The method according to this invention achieves spheroidized particles that have a relatively high melting temperature and/or a relatively large average diameter, including particles that have an average diameter greater than 0.35 to 0.45 mm, and produces spheroidized particles that can withstand relatively high compressive forces.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

As used throughout the specification and claims, the phrase melting temperature refers generally to a temperature at which a solid-liquid phase transformation of a material occurs. As used throughout the specification and claims, the phrase softening temperature refers generally to the lowest temperature at which a material begins to behave like a liquid. As used throughout the specification and claims, the phrase spheroidization temperature refers generally to the lowest temperature at which the surface of a non-spherical particle begins to become a sphere. A spheroidization temperature of a material generally equals or exceeds a softening temperature of the material. As used throughout the specification and claims, the phrase agglomeration temperature refers generally to the temperature at which contact between particles results in such particles sticking together.

Figure 1:
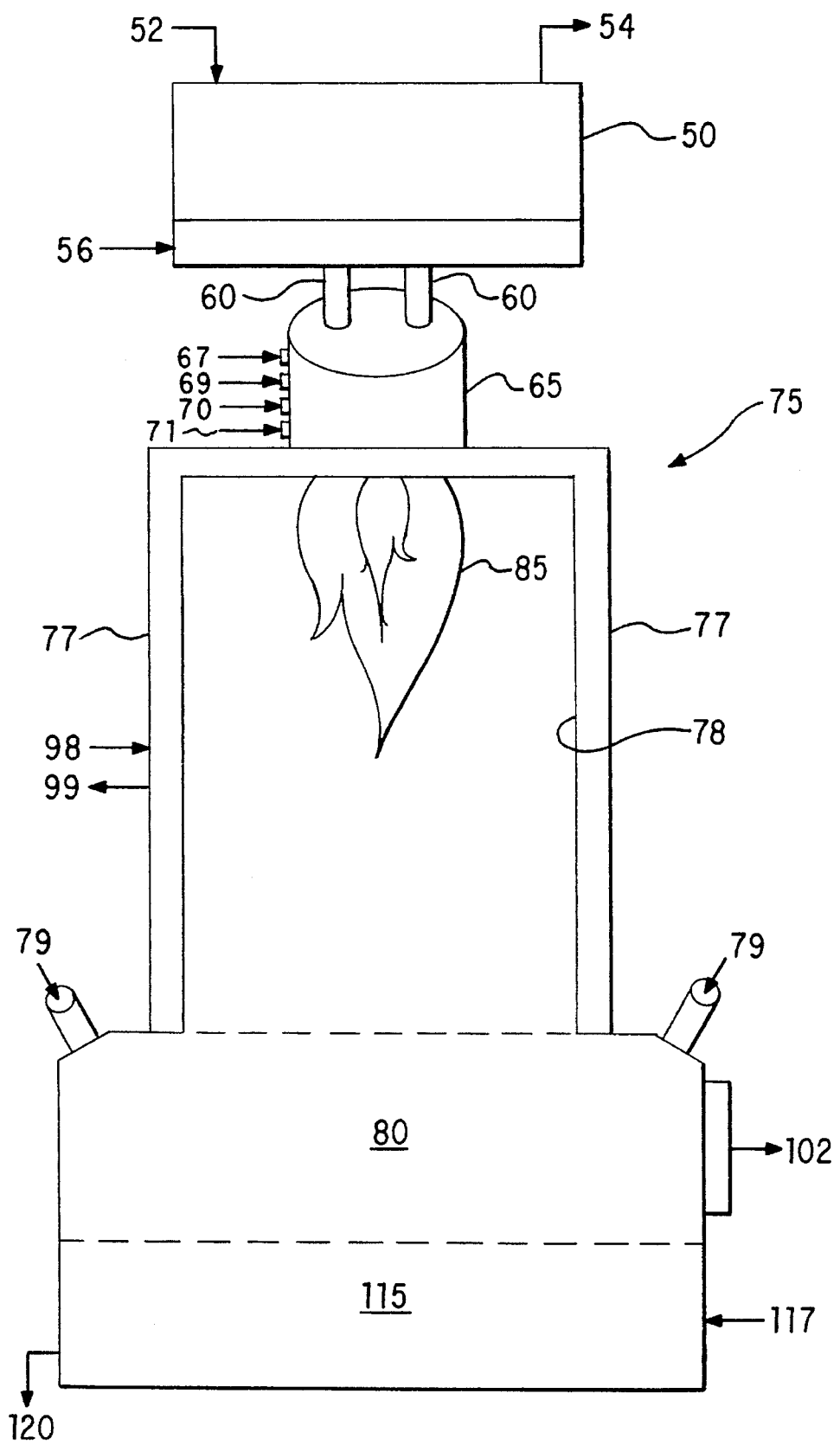
FIG. 1 shows a schematic view of an apparatus for operating a method for spheroidizing particles according to one preferred embodiment of this invention.

FIG. 1 shows a schematic diagram illustrating an apparatus for operating a method according to one preferred embodiment of this invention. Raw material is fed to preheater 50 through preheater inlet 52. According to one preferred embodiment of this invention, preheater 50 comprises a fluidized bed. Such raw material can comprise any desired material which is to be spheroidized. According to one preferred embodiment of this invention, the raw material comprises a ceramic material, or any other material that has a relatively high melting or softening temperature such as mullite. The method of this invention also achieves spheroidization of particles that have a relatively large average diameter, including particles that have an average diameter greater than 0.35 mm to 0.45 mm. As used throughout the specification and claims, the phrase average diameter when used with respect to raw material, refers generally to twice the average distance from the surface of the particle to the center of the particle.

A conventional fuel and oxidizing agent, such as natural gas and oxygen, can be fed to preheater 50 through fuel inlet 56. It is apparent that other fuels and oxidizing agents, as well as other means for introducing fuels and oxidizing agents, could readily be used with the process according to this invention. Preheater 50 preferably heats the particles to a temperature below an agglomeration temperature of the particles. Flue gases generated in preheater 50 exit through preheater outlet 54. It is apparent that the time period for preheating the particles in preheater 50, and the temperature within preheater 50, can differ depending upon the composition of the raw material and/or the average diameter of the particles. For material having a relatively high softening temperature such as about 1850° C. to about 2200° C., such as ceramics for example, the material can be preheated to a temperature of about 1200° C. to about 1400° C. For spheroidization of relatively large particles that have a relatively low softening temperature, the preheating temperature is preferably nearer the softening temperature. Certain parameters, such as the heat capacity of the burner, and the temperature of the preheater and the furnace are determined as a function of the type and size of material.

Figure 2:
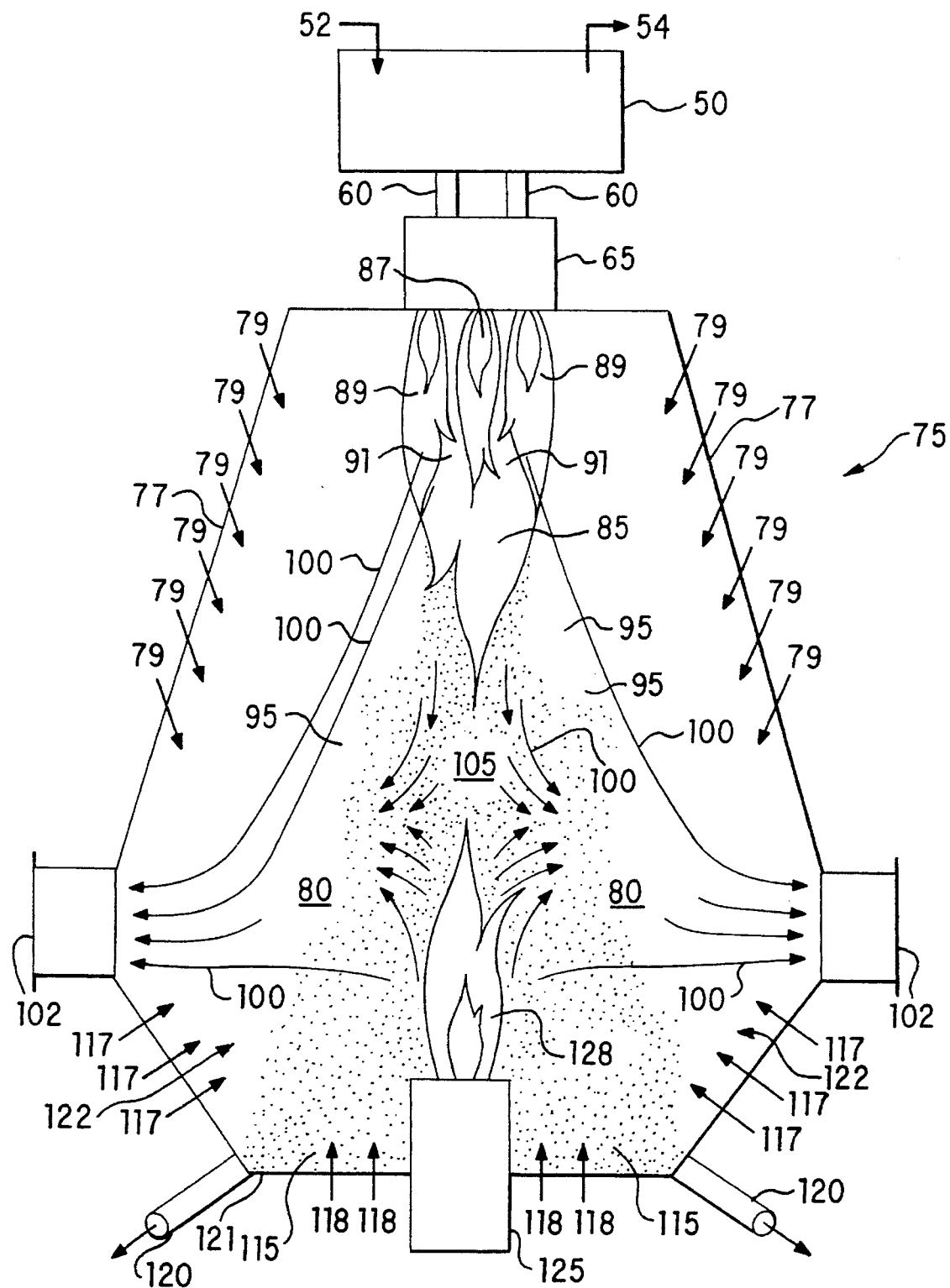
FIG. 2 shows a schematic view of an apparatus for operating a method for spheroidizing particles according to another preferred embodiment of this invention.

After the particles are sufficiently preheated in preheater 50 to a temperature below an agglomeration temperature of the particles, the particles are passed through tubes 60 into first burner 65. Tubes 60 preferably comprise insulation to reduce heat loss from the particles. According to one preferred embodiment of this invention, multiple tubes 60 pass a plurality of streams of particles to first burner 65. The particles are preferably spaced apart to avoid substantial contact between the particles. According to one preferred embodiment of this invention, first burner 65 has multiple fuel inlets 69, 70 and multiple oxidizer inlets 67, 71. For example, fuel mixtures of different or identical compositions can enter first burner 65 through first fuel inlet 69 and second fuel inlet 70. Similarly, oxidizing agents of different compositions can enter first burner 65 through first oxidizer inlet 67 and second oxidizer inlet 71. Fuel inlets 69, 70 and oxidizer inlets 67, 71 can be in communication with specific orifices in a burner nozzle of the first burner 65. Thus, any desired flows of fuel and oxidizer can be fed to such orifices in a burner nozzle to achieve a first flame envelope 85 that comprises multiple flame zones, such as inner flame zone 87 and outer flame zone 89, as shown in FIG. 2. Inner flame zone 87 can achieve a higher or a lower temperature than outer flame zone 89. Raw material, in the form of particles 95, can be transported through specific raw material orifices in the burner nozzle and into inner flame zone 87, outer flame zone 89, or intermediate flame zone 91.

According to another preferred embodiment of this invention, first flame envelope 85 is arranged to provide substantially uniform heat flux to multiple streams of particles 95. Particles 95 enter first flame envelope 85 via intermediate flame zone 91. As clearly shown in FIG. 2, intermediate flame zone 91 exists between inner flame zone 87 and outer flame zone 89. Inner flame zone 87 is preferably positioned generally symmetrical about a central axis of first flame envelope 85. Inner flame zone 87 primarily heats the surface portion of particles 95 exposed to inner flame zone 87. Outer flame zone 89 surrounds intermediate flame zone 91 and primarily heats the surface portion of particles 95 exposed to outer flame zone 89. Thus, as particles 95 are heated from both inner flame zone 87 and outer flame zone 89, they are heated to a spheroidization temperature.

According to another preferred embodiment of this invention, particles 95 enter first flame envelope 85 via inner flame zone 87 and/or outer flame zone 89. Such embodiment is possible particularly when particles 95 are relatively small.

First flame envelope 85 is preferably directed downward, preferably with respect to gravity, into furnace 75. Particles 95 are heated in first flame envelope 85 to a temperature above a spheroidization temperature of the raw material. At least the surfaces of particles 95 become sufficiently heated to allow surface tension stresses of particles 95 to cause spheroidization of particles 95. First flame envelope 85 preferably has a temperature at least about 300° C. to about 400° C. higher than the softening temperature of particles 95. For example, if particles 95 comprise mullite, first flame envelope 85 preferably has a temperature of at least about 2150° C. to about 2200° C.

As shown in FIG. 1, furnace 75 preferably comprises water-cooled furnace walls 77. Water enters furnace wall 77 through cooling water inlet 98, and is discharged from furnace wall 77 through cooling water outlet 99. According to one preferred embodiment of this invention, interior furnace wall surface 78 comprises a high temperature refractory lining. The interior of the furnace is designed to provide for inflame retention time necessary to spheroidize particles 95.

After first flame envelope 85 discharges particles 95, particles 95 enter an area generally defined as first cooling zone 80. The gradual staged cooling according to one preferred embodiment of this invention eliminates surface tension stresses and undesirable structural change that can occur with conventional spheroidization methods. Such staged cooling achieves spheroidized particles that have relatively low internal stresses and can withstand relatively high compressive forces. Although first cooling zone 80 is shown in FIG. 1 as a separate unit, first cooling zone 80 is preferably contained within furnace 75, as shown in FIG. 2. First cooling zone 80 is generally downstream with respect to first flame envelope 85. Cooling fluids enter first cooling zone 80 through multiple injection nozzles installed throughout furnace wall 77. First cooling inlets 79 represent a schematic implementation of such injection nozzles. Cooling gases, cooling liquids, or a mixture of gases and liquids are injected through cooling inlets 79 into the interior of furnace 75. According to another preferred embodiment of this invention, second cooling inlets 117 are provided in a lower portion of furnace wall 77 and are directed toward first flame envelope 85. According to yet another preferred embodiment of this invention, cooling water inlet 122 is provided to supplement or replace second cooling air inlets 117. Thus, first cooling zone 80 can con, rise a variety of cooling fluids. First cooling zone 80 provides for an initial controllable cooling stage which cools particles 95 below a spheroidization temperature, preferably to a temperature about ⅔ to about ½ of the spheroidization temperature.

As shown in FIG. 2, flue gases, indicated by element reference numeral 100, and vapors of cooling fluids, are discharged from the interior of furnace 75 through fluid outlets 102.

Particles 95 are preferably further cooled in a second cooling area shown generally by second cooling zone 115, that is downstream with respect to first cooling zone 80. Second cooling zone 115 preferably comprises a cooling fluidized bed. Such fluidized bed can be implemented by forcing air or water, or any other suitable fluid through fluid inlets 118. According to one preferred embodiment of this invention, bottom furnace wall 121 comprises submerged cooled tubes which are cooled by a pressurized fluid, such as water. Generally, particles 95 are cooled in second cooling zone 115 to a temperature at which particles 95 can be transported to a final cooling zone. According to one preferred embodiment of this invention, particles 95 are cooled in second cooling zone 115 to about 300° C. to about 600° C.

Particles 95 are discharged from furnace 75 through particle outlets 120 and preferably enter a third cooling zone, not shown. The third cooling zone preferably comprises a water-cooled chamber that has a water-cooled bottom. The water-cooled bottom preferably vibrates to cause movement of particles 95. Particles 95 can be cooled in the third cooling zone to a temperature suitable for handling and packaging particles 95.

According to another preferred embodiment of this invention, a second burner 125 can be provided for raw materials that have a very high melting point, and/or for raw materials that have a relatively large average diameter. Second burner 125 preferably is positioned on a bottom of furnace 75 and is directed toward first burner 65, as shown in FIG. 2. Second burner 125 increases the temperature within melting area 105, which provides for an increased heat flux for particles 95. The flame stream of second flame envelope 128 reduces the downward velocities of gases and particles emitted from first burner 65, and thus increases the retention time of particles 95 in first flame 85 and melting area 105.

First burner 65 and second burner 125 preferably operate as a combined combustion system providing sufficient gas velocities, composition, heat release and temperature in melting area 105. For example, second burner 125 can introduce excess fuel such as natural gas or excess oxidizer into melting area 105 to react with excess oxidizer or excess fuel introduced through first burner 65 to increase the temperature of melting area 105. The flame stream of second burner 125 increases horizontal movement of particles 95. Thus, second burner 125 can act as a classifier, since the horizontal velocity component of particles 95 that have a smaller size and mass is greater than the horizontal velocity component of particles 95 that have a larger size and mass. Thus, smaller particles 95 enter first cooling zone 80 sooner than larger particles 95, and thus unnecessary overheating is avoided and the probability of undesirable agglomeration is reduced. The value of the horizontal velocity components of the gases and particles 95 are a function of the velocities and temperatures of first burner 65 and second burner 125 and a distance between such burners.

According to another preferred embodiment of this invention, the temperature and retention time within flame envelope 85 is sufficient to spheroidize particles 95, and second burner 125 is used as a nozzle for cold gas injection to increase the cooling rate of particles 95.

While in the foregoing specification this invention has been described in relation to certain preferred embodiments thereof, and many details have been set forth for purpose off illustration it will be apparent to those skilled in the art that the invention is susceptible to additional embodiments and that certain of the details described herein can be varied considerably without departing from the basic principles of the invention.

We claim:

1. A method for producing spheroidized particles, comprising the steps of:

preheating a plurality of particles to a first temperature below an agglomeration temperature of said particles;

passing at least a portion of said particles through a flame region comprising a first flame envelope;

heating said particles in said flame region above a spheroidization temperature; and cooling said particles at an initial rate to a first temperature below said spheroidization temperature in a first cooling zone downstream with respect to a direction of a first flame stream.

2. A method according to claim 1, wherein said particles are introduced into an intermediate zone of said first flame envelope, said intermediate zone generally surrounds an inner flame zone of said first flame envelope, and an outer flame zone of said first flame envelope generally surrounds said intermediate zone.

3. A method according to claim 1, further comprising forming a melting zone in between said first flame envelope and a second flame envelope downstream with respect to said first flame envelope, and heating said particles in said melting zone.

4. A method according to claim 3, wherein said second flame envelope is directed toward said first flame envelope.

5. A method according to claim 1, wherein said particles are further cooled downstream with respect to said first cooling zone in a second cooling zone at a secondary rate to a second temperature below said first temperature.

6. A method according to claim 5, wherein said particles are further cooled downstream with respect to said second cooling zone in a third cooling zone to about an ambient temperature.

7. A method according to claim 6, further comprising vibrating said particles in said third cooling zone.

8. A method according to claim 1, wherein said first flame envelope is directed in a gravity flow direction.

9. A method according to claim 1, wherein said particles are passed through at least one insulated conduit and into said first flame envelope.

10. A method according to claim 1, wherein said particles are passed in a fluidized concentration that prevents substantial contact between said particles.

11. A method according to claim 1, wherein said particles are passed continuously.

\* \* \* \* \*